US007822407B2

(12) United States Patent
Huang et al.

(10) Patent No.: US 7,822,407 B2
(45) Date of Patent: Oct. 26, 2010

(54) METHOD FOR SELECTING THE AUTHENTICATION MANNER AT THE NETWORK SIDE

(75) Inventors: Yingxin Huang, Guangdong (CN); Yajuan Wu, Guangdong (CN); Wenlin Zhang, Guangdong (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 920 days.

(21) Appl. No.: 11/473,666

(22) Filed: Jun. 23, 2006

(65) Prior Publication Data

US 2007/0113086 A1 May 17, 2007

Related U.S. Application Data

(63) Continuation-in-part of application No. PCT/CN2005/001487, filed on Sep. 19, 2005.

(51) Int. Cl.
*H04M 1/66* (2006.01)
(52) U.S. Cl. ............. 455/411; 455/433; 455/435.1; 455/410; 370/395.52; 379/121.06; 379/239; 379/261; 379/142.05; 379/88.17; 379/265.09; 726/2; 726/3; 726/4; 726/11; 726/17; 726/21; 726/27; 726/29; 713/155; 713/161; 713/168; 713/169; 713/170; 713/176; 390/247; 390/248; 390/249; 390/250
(58) Field of Classification Search ............. 455/433, 455/435.1; 370/395.52; 379/121.06, 239; 379/261, 142.05, 88.17, 265.09; 726/2, 3, 726/4, 11, 17, 21, 27, 29; 713/155, 161, 713/168, 169, 170, 176; 380/247, 248, 249, 380/250
See application file for complete search history.

(56) References Cited

U.S. PATENT DOCUMENTS 6,594,242 B1 7/2003 Kransmo
(Continued)

FOREIGN PATENT DOCUMENTS

CN 1339231 3/2002
(Continued)

OTHER PUBLICATIONS

Liu Zi-Long, Lu Zheng-Xin, Huang Zai-Lu, 2G and 3G Mobile Network's Security and User Authentication, Network & Communication, 2002, No. 2.
(Continued)

*Primary Examiner*—Rafael Pérez-Gutiérrez
*Assistant Examiner*—Nimesh Patel
(74) *Attorney, Agent, or Firm*—Slater & Matsil, L.L.P.

(57) ABSTRACT

The present invention discloses a method for a network to choose an authentication mode, wherein the key lies in that, according to the received authentication information in the authentication vector request message from S-CSCF as well as according to type of the requesting subscriber, HSS returns authentication information of the Early-IMS-based authentication vector to S-CSCF, or returns authentication information of the Full-IMS-based authentication mode to S-CSCF, or directly returns failure information to S-CSCF. If it is under the former two situations, the subscriber will be authenticated by adopting the corresponding authentication mode, and then S-CSCF will return access-allowed or access-rejected information to the subscriber according to authentication result. If it is in the latter situation, S-CSCF will directly send access-rejected information to the subscriber. By applying the present invention, the network can choose a proper authentication mode to authenticate the subscriber according to the subscriber's requirements, so that processing ability of the network is enhanced and the network is compatible with original security protocols to the fullest extent.

16 Claims, 3 Drawing Sheets

U.S. PATENT DOCUMENTS

2003/0159067 A1* 8/2003 Stirbu .................... 713/201
2004/0203763 A1* 10/2004 Tammi .................. 455/435.1
2005/0181764 A1 8/2005 Hahn et al.

FOREIGN PATENT DOCUMENTS

WO 03105436 12/2003

OTHER PUBLICATIONS

International Search Report for International Application No. PCT/CN2005/001487, mailed Dec. 29, 2005.
European Search Report for corresponding European Application No. EP 05785078 completed on Nov. 23, 2006.
3GPP SA WG3: 3rd Generation Partnership Project; Technical Specification Group Services and System Aspects; Security Aspects of Early IMS (Release 6), 3GPP TR 33.cde V0.0.2, 3GPP Draft Technical Recommendation, Jul. 2004, pp. 1-16, Retrieved from the Internet: URL:http://www.3gpp.org/ftp/tsg_sa/WG3_Security/TSGS3_34_Acapulco/Docs/ZIP/S3-040685.zip on Nov. 21, 2006.
3GPP: "Digital cellular telecommunications system (Phase 2+); Universal Mobile Telecommunications System (UMTS); 3G security; Access security for IP-based services (3GPP TS 33.203 version 6.3.0 Release 6)" ETSI Standards, European Telecommunications Standards Institute, Sophia-Antipo, FR, vol. 3-SA3, No. V580, Dec. 2003, pp. 1-42, Retrieved from the Internet: URL:http://www.3gpp.org/ftp/Specs/archive/33_series/33.203/33203-630.zip> on Nov. 23, 2006.
3GPP: "Digital cellular telecommunications system (Phase 2+); Security-related network functions (3GPP TS 43.020 version 5.0.0 Release 5)" ETSI Standards, European Telecommunications Standards Institute, Sophia-Antipo, FR, vol. 3-SA3, No. V500, Jul. 2002 pp. 1-97.

* cited by examiner

METHOD FOR SELECTING THE AUTHENTICATION MANNER AT THE NETWORK SIDE

CROSS-REFERENCE TO RELATED APPLICATIONS

This application is a continuation-in-part of PCT Application No. PCT/CN2005/001487, filed Sep. 19, 2005, pending, which designates the U.S., which is hereby incorporated herein by reference in its entirety, and which claims priority from Chinese Application No. 200410080104.4, filed Sep. 23, 2004.

FIELD OF THE TECHNOLOGY

The present invention relates to mobile communication technique field, more particularly to a method for network to choose an authentication method when a subscriber is applying IP Multimedia Subsystem (IMS) network.

BACKGROUND OF THE INVENTION

With the development of broadband network, mobile communication is not just limited to traditional voice communication. By integrating with data services like Presentation Services, Short Messages, WEB Browing, location information, PUSH services and file sharing, mobile communication can implement all kinds of media services such as audio, video, images and texts so as to meet various demands of subscribers.

With the purpose of implementing various multimedia applications by making use of a standardized open structure in mobile networks to provide more choices and richer tastes for subscribers, the framework of an IP-based Multimedia Subsystem (IMS) is put forward by the Third Generation Partnership Project (3GPP), the Third Generation Partnership Project 2 (3GPP2) and the like.

The IMS framework is superimposed upon the packet domain network, wherein entities relevant to authentication comprise a Call Session Control Function (CSCF) entity and a Home Subscriber Server (HSS) functional entity.

The CSCF entity comprises three logical entities, namely Serving CSCF (S-CSCF), Proxy CSCF (P-CSCF) and Inquiry CSCF (I-CSCF), wherein these three logical entities may be located in different physical equipments or different functional modules inside one physical equipment. As the service switching center of IMS, S-CSCF is used to perform session control, maintain session states, manage subscriber information and generate charging information, etc; as the access point of terminal to IMS, P-CSCF is used to fulfill subscriber registration, Quality of Service (QoS) control and security management, etc; I-CSCF is in charge of intercommunication between IMS domains, managing S-CSCF allocation, concealing network topology structure and configuration information from externals, generating charging data and so on. HSS is a subscriber data bank with great importance and is used for supporting each network entity to process callings and sessions.

IMS is based on the third generation mobile communication network and offers abundant services, accordingly responding to operators' demands of utilizing IMS on the second-generation (2G) network. However, IMS functions with respect to security based on the third-generation (3G) network, such as the access authentication based on IMS layer, are not supported by 2G network, therefore, a transitional authentication scheme for 2G network adopting IMS services emerges in the prior art, wherein the authentication scheme is also called Early-IMS-based authentication scheme or IP-based authentication scheme and provides certain security functions for 2G subscribers to apply IMS services. When the network is updated to 3G network, full 3G-based authentication mode, namely Full-IMS-based authentication mode, will be applied.

When applying IMS, the prior 2G-based authentication mode, namely the Early-IMS-based authentication scheme, is as follows:

First of all, a user equipment (UE) is accessed to 3GPP Packet Section-Domain (PS-Domain), wherein the PS-Domain network will authenticate the subscriber; and if the subscriber passes the authentication, Gateway GPRS Supporting Node (GGSN) of PS-Domain network will allocate an IP address for the subscriber to apply when enjoying the IMS services. GGSN notifies the IP address and telephone number (MSIDSN) to HSS via intermediate entities. HSS looks up the subscriber's IP Multimedia Private Identity (IMPI) in the IMS through the MSIDSN and bonds the information like the subscriber's IMPI, MSISDN, IP address and the like for storage. When the subscriber needs to utilize IMS, the UE will firstly send a Message of register request that is forwarded to S-CSCF via an intermediate entity, then S-CSCF obtains the bond relationship between the subscriber's IMPI and IP address from HSS and stores the relationship, and then S-CSCF checks whether the IMPI and the used IP address from UE match the self-stored IMPI and IP address; if yes, the UE will be determined as legal and get access to use IMS services, otherwise, the 2G-based UE will be determined as illegal and rejected.

When applying IMS, the prior 3G-based authentication mode, namely the authentication scheme supporting Full-IMS-based subscriber, is as follows:

the UE is accessed to 3GPP PS-Domain. If the UE passes the authentication of PS-Domain, GGSN will allocate an IP address for the subscriber to establish a connection. If the subscriber needs to utilize IMS services, the UE will send a Register message in IMS domain and the message is forwarded to S-CSCF, then S-CSCF requests HSS for an authentication vector to perform IMS service authentication to the subscriber by utilizing an Authentication and Key Agreement (AKA) protocol. If the authentication is successful, the subscriber will be allowed to access IMS services; otherwise the subscriber will be rejected.

Although both 2G-based subscribers and 3G-based subscribers can access and apply IMS services, and 2G-based IMS access mode and 3G-based IMS access mode are compatible, the existing problem is that, as to a system updated to 3G, the core network in IMS cannot decide which authentication mode should be adopted to authenticate the subscriber after receiving the subscriber's Message of register request, and will directly apply 3G-based authentication mode to authenticate the subscriber. In this way, a legal 2G-based subscriber cannot get access, since the authentication modes for the 2G-based subscribers are different from those for 3G-based subscribers. Further, failing to pass the 3G-based authentication, the 2G-based subscribers will be determined as illegal, which leads to inaccurate rejection of legal subscribers and poor error tolerant ability of the network.

SUMMARY OF THE INVENTION

The main object of the present invention is to provide a method for network to choose an authentication mode so that network can choose a proper authentication mode based on the subscriber's requirements.

To obtain the above object, technical scheme of the present invention is implemented as follows:

A method for network to choose an authentication mode, comprises the steps of:

a. a Serving-Call Session Control Function (S-CSCF) entity receiving a Message of register request from a subscriber; and sending an authentication vector request with a required authentication mode identifier to a Home Subscriber Server (HSS);

b. the HSS judging whether the S-CSCF requests the authentication information of an Early-IMS-based authentication vector according to the required authentication mode identifier; and if yes, executing step d; Otherwise, determining type of the subscriber that requests access, if the subscriber supports a Full-IMS-based authentication mode, returning authentication information of the Full-IMS-based authentication mode and executing step c; if the subscriber is 2G based, executing alteratively step d and step e;

c. the S-CSCF authenticating the subscriber that requests access and supports Full-IMS-based authentication mode by adopting the Full-IMS-based authentication mode; if the subscriber passes the authentication, returning access-allowed information to the subscriber and ending the process; if the authentication is unsuccessful and cause of the unsuccessful authentication is that the authentication mode is not supported, the S-CSCF sending the authentication vector request with the requested Early-IMS-based authentication vector identifier to HSS, and executing step b;

d. HSS returning authentication information of the Early-IMS-based authentication vector to the S-CSCF, the S-CSCF returning access-allowed information or access-rejected information to the 2G-based subscriber according to the authentication result obtained by adopting Early-IMS-based authentication vector, and ending the process;

e. HSS returning unsuccessful information, which indicates that the authentication mode is not supported, to the S-CSCF; the S-CSCF notifying the 2G-based subscriber of access rejection after receiving the unsuccessful information, and ending the process.

Wherein the subscriber that supports Full-IMS-based authentication mode is 3G-based, the Message of register request information received by the S-CSCF from the subscriber in step a, further comprises: information of access network type;

when the authentication is unsuccessful and cause of the unsuccessful authentication is that the authentication mode is not supported, the step c further comprises: the S-CSCF determining access network type of the subscriber, if access network is a 2G network, continuing to execute the subsequent steps, if the access network is a 3G network, directly returning access-rejected information to the subscriber.

Wherein the authentication vector request with the required authentication mode identifier sent to HSS by S-CSCF, further comprises: information of access network type;

the subscriber that supports the Full-IMS-based authentication mode is 3G based;

in step b, after the HSS determining that the S-CSCF requires authentication information of the Early-IMS-based authentication vector, further comprises:

HSS judging the access network type of the subscriber; if the access network is a 2G network, continuing to execute the subsequent steps; if the access network is a 3G network and the subscriber requesting access is 3G based, returning authentication information that Full-IMS-based authentication mode is supported to the S-CSCF; after receiving the authentication information, the S-CSCF either executing step c or directly returning access-rejected information to the subscriber.

Wherein the authentication information that the Full-IMS-based authentication mode is supported is a AKA-based authentication vector information;

the step of authenticating the subscriber requesting access by adopting the Full-IMS-based authentication mode in step c, comprises: adopting an AKA protocol to authenticate the subscriber.

Wherein the authentication information of the Early-IMS-based authentication vector is an IP address binding information of an IP Multimedia Private Identity (IMPI) and an IP address;

the step of the S-CSCF obtaining authentication result when the Early-IMS-based authentication vector is adopted in step d, comprises:

the S-CSCF checking whether the received subscriber's IP address matches the IP address in the IP address binding information of the IMPI and the IP address received from HSS; if yes, the authentication is successful, otherwise, the subscriber doesn't pass the authentication, and the authentication result is directly obtained.

Wherein step d of the HSS returning the Early-IMS-based authentication information to the S-CSCF, comprises:

the HSS directly returning the Early-IMS-based authentication information to the S-CSCF, or, the HSS returning unsuccessful information indicating that the authentication mode is not supported by the S-CSCF; after receiving the unsuccessful information thereof, the S-CSCF sending the authentication vector request with the identifier requiring for Early-IMS-based authentication vector to the HSS, and then the HSS returning Early-IMS-based authentication information to the S-CSCF according to the request.

Wherein authentication vector request sent to the HSS by the S-CSCF in step a further comprises: an IP address of the subscriber;

the authentication information of the Early-IMS-based authentication vector is the IP address binding information of the IMPI and the IP address;

step d of the S-CSCF obtaining the authentication result when the Early-IMS-based authentication vector is adopted, comprises:

the HSS checking whether the subscriber's IP address from the S-CSCF matches the IP address in the IP address binding information of the self-stored subscriber's identity identifier and the IP address; and if yes, the authentication is successful and authentication success information is transmitted to the S-CSCF, otherwise, unsuccessful authentication information is transmitted to the S-CSCF.

Wherein step a further comprises, the S-CSCF judging whether the Message of register request from the subscriber comprises the identifier requiring for the Early-IMS-based authentication vector; and if yes, sending the authentication vector request requiring for the Early-IMS-based authentication vector, otherwise, sending the authentication vector request requiring the Full-IMS-based authentication mode.

Wherein the identifier requesting for the Early-IMS-based authentication vector, which is comprised in the Message of register request sent by the subscriber either via a predefined field of the message or a predefined default value, indicates the Early-IMS-based authentication vector is utilized;

the predefined default value is the authentication mode message does not contain the security headers used in t Full-IMS-based authentication mode message.

Wherein the identifier requesting for the Early-IMS-based authentication vector comprised in the authentication vector request message sent to HSS by S-CSCF, is carried in a field that indicates the request for the Full-IMS-based authentication mode.

By applying the present invention, after receiving an authentication vector request from S-CSCF, HSS judges the requested authentication vector information: if S-CSCF requests for authentication information of the Early-IMS-based authentication vector, HSS will return authentication information to the S-CSCF and authenticate the subscriber requesting access by adopting the Early-IMS-based authentication vector; if S-CSCF requests for authentication information of a 3G-based authentication mode, HSS will continue to judge the type of the subscriber requesting access: if the subscriber is 3G-based, HSS returns authentication information of 3G-based authentication mode to S-CSCF and authenticate the subscriber by adopting a 3G-based authentication mode. If the subscriber is 2G-based, HSS will return failure information to S-CSCF and S-CSCF will notify UE the authentication is unsuccessful and the subscriber is rejected, or, HSS will return Early-IMS-based authentication information to S-CSCF and authenticate the subscriber requesting access by adopting the Early-IMS-based authentication vector. According to authentication result, S-CSCF will return access-allowed information or access-rejected information to the subscriber.

By applying the present invention, network can choose the right authentication mode to authenticate the subscriber according to the subscriber's demands, so that network processing capability is enhanced, and network can be compatible with original protocols to the fullest extent.

DETAILED DESCRIPTION OF THE INVENTION

The present invention will be described in detail hereinafter with reference to the accompanying drawings as well as specific embodiments.

As to 3G network, in authentication vector request message conforming to the prior protocol, which is sent to HSS by S-CSCF, there is a special field used to identify an authentication vector requesting for 3G-based authentication mode, namely AKA-based authentication scheme, and content of the field should be unique. In order to enable 3G network to identify Early-IMS-based authentication vector, an identifier of the new option authentication mode is added to the field so as to represent the authentication vector requesting Early-IMS-based authentication vector. Moreover, an identifier representing the request for a 3G-based authentication mode is set up as the default option of the field, and an identifier requesting Early-IMS-based authentication vector is set up as an optional choice of the field.

In the authentication vector request message sent to HSS by S-CSCF, the added identifier representing the request for 3G-based authentication mode or Early-IMS-based authentication vector is not limited to the above scheme, if only HSS can identify the authentication information is used for 3G-based authentication mode or Early-IMS-based authentication vector.

Figure 1:
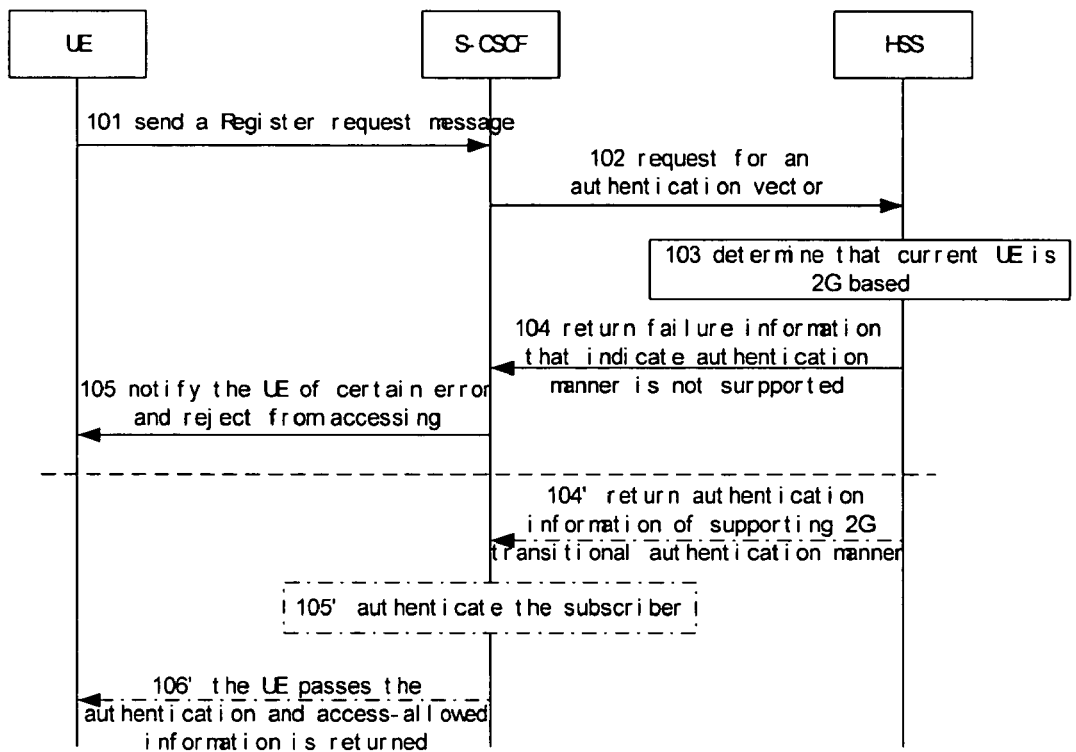
FIG. 1 is a schematic diagram illustration according to the embodiment 1 of the present invention.

FIG. 1 is a schematic diagram illustration according to the embodiment 1 of the present invention. The Subscriber of the present embodiment is 2G based, adopting a 2G-based user equipment (UE) or a 3G-based UE.

Step 101: when needing to use IMS services, UE will initiate a Message of register request in the IMS domain, wherein the Message of register request is transmitted to S-CSCF via P-CSCF and I-CSCF.

Step 102: S-CSCF chooses a 3G-based authentication mode, namely AKA-based authentication scheme, according to prior protocol procedure and sends an authentication vector request message to HSS, namely S-CSCF requests HSS for AKA-based authentication vector information, meanwhile, the request message comprises the subscriber's identity identifier. The identity identifier thereof can be either IMPI or IP Multimedia Public User identity (IMPU); if it is IMPU, HSS will find corresponding IMPI according to the IMPU.

Step 103: HSS receives the authentication vector request from S-CSCF. After obtaining AKA-based authentication vector information thereof according to identifier of the requested authentication mode in the request message, HSS will continue to look up the subscriber's description information according to the subscriber identity identifier in the request message so as to judge the type of the subscriber requesting access. In the present embodiment, HSS determines that the subscriber requesting access is 2G-based which doesn't support AKA-based authentication scheme. Hereby, there are two schemes for HSS to execute: one is to execute step 104~105, and another is to execute step 104'~106'. The operator decides which scheme is to be executed. The two schemes will be described hereinafter respectively.

The First Scheme:

Steps 104~105: HSS returns failure information to S-CSCF indicating that the authentication mode is not supported. After receiving the failure information, S-CSCF will send a message to notify UE of the error, namely to reject UE from accessing; UE will not register over again automatically after receiving the error notification, and the present process is ended.

If the UE supports the Early-IMS-based authentication vector and the subscriber knows capability of the UE, the subscriber can operate UE to initiate the Message of register request again; namely to execute step 101 again to send a new Message of register request which comprises an identifier to request for Early-IMS-based authentication vector; after receiving the request, S-CSCF will directly request an authentication vector supporting Early-IMS-based authentication vector; S-CSCF will send an authentication vector request to HSS according to the received Message of register request information, wherein the authentication vector request comprises an identifier to request for the Early-IMS-based authentication vector. The request message also comprises the subscriber's IMPI or IMPU; if it is IMPU, HSS will find corresponding IMPI according to the IMPU. After receiving the request, HSS will return authentication information of Early-IMS-based authentication vector to S-CSCF; namely the IP address binding information of the IMPI and the IP address of the subscriber. After receiving the returned message, S-CSCF will authenticate the subscriber by adopting the Early-IMS-based authentication vector; namely check whether subscriber's IP address in the Message of register request from UE matches the IP address in the IP address binding information of the IMPI and the IP address from HSS; if yes, the subscriber will be determined as legal and the IP address binding information of the IMPI and the IP address of the subscriber will be stored. If the subscriber passes the authentication, S-CSCF will send access-allowed information to UE. If the subscriber does not pass the authentication, S-CSCF will send access-rejected information to UE.

The above-mentioned process of authenticating UE can also be fulfilled by HSS. When authenticating operation upon UE is fulfilled by HSS, the transmitted authentication vector request will carry IP address of the subscriber requesting access; HSS will check whether this IP address matches the self-stored IP address in the IP address binding information of the IMPI and the IP address; if yes, the subscriber will be determined as legal, thereby, the information returned to S-CSCF by HSS will indicate that the UE passes authentication and will also carry the IP address binding information of the IMPI and the IP address of the subscriber for S-CSCF to apply in subsequent operation; otherwise, the subscriber will be determined as illegal, and, the information returned to S-CSCF by HSS will indicate that the UE does not pass the authentication; namely failure information of authentication will be returned.

The Second Scheme:

Step 104': HSS returns authentication vector information of an Early-IMS-based authentication vector to S-CSCF; namely the IP address binding information of the IMPI and the IP address of the subscriber.

In specific application, there are two ways to implement the process that HSS returns authentication vector information of an Early-IMS-based authentication vector to S-CSCF, which will be described hereinafter. The operator will determine which way to be adopted.

One way is that, HSS directly returns authentication vector information of an Early-IMS-based authentication vector to S-CSCF; the other way is that, HSS returns failure information indicating the authentication mode is not supported to S-CSCF, and then S-CSCF will resend an authentication vector request to HSS after receiving the failure information. Wherein the request comprises an identifier requesting for the Early-IMS-based authentication vector. After acquiring authentication information of Early-IMS-based authentication vector that S-CSCF requests, HSS will return authentication information of Early-IMS-based authentication vector to S-CSCF.

Step 105': after receiving the returned message, S-CSCF will authenticate the subscriber by adopting Early-IMS-based authentication vector; namely check whether subscriber's IP address in the Message of register request from UE matches the IP address in the IP address binding information of the IMPI and the IP address from HSS; and if yes, the subscriber will be determined as legal, and the IP address binding information of the IMPI and the IP address of the subscriber will be stored.

In the above-mentioned step 105', the process of authenticating UE can also be fulfilled by HSS. When authenticating operation upon UE is fulfilled by HSS, the authentication vector request transmitted in step 102 will carry IP address of the subscriber requesting access; HSS will check whether this IP address matches the self-stored IP address in the IP address binding information of the IMPI and the IP address; if yes, the subscriber will be determined as legal, hereby, the information returned to S-CSCF by HSS will indicate that the UE passes authentication and will also carry the IP address binding information of the IMPI and the IP address of the subscriber for S-CSCF to apply in subsequent operation; otherwise, the subscriber will be determined as illegal, and the information returned to S-CSCF by HSS will indicate that the UE does not pass the authentication; namely failure information of authentication will be returned.

Step 106': if subscriber passes the authentication, S-CSCF will send access-allowed information to UE. If the subscriber does not pass the authentication, S-CSCF will send access-rejected information to UE.

In the above-mentioned embodiment, if HSS decides the needed authentication information requested by S-CSCF belongs to AKA-based authentication mode and the subscriber is a 3G-based subscriber, HSS will return authentication information of 3G-based authentication mode to S-CSCF, and accordingly, subsequent authenticating process is based on 3G-based authentication mode.

Figure 2:
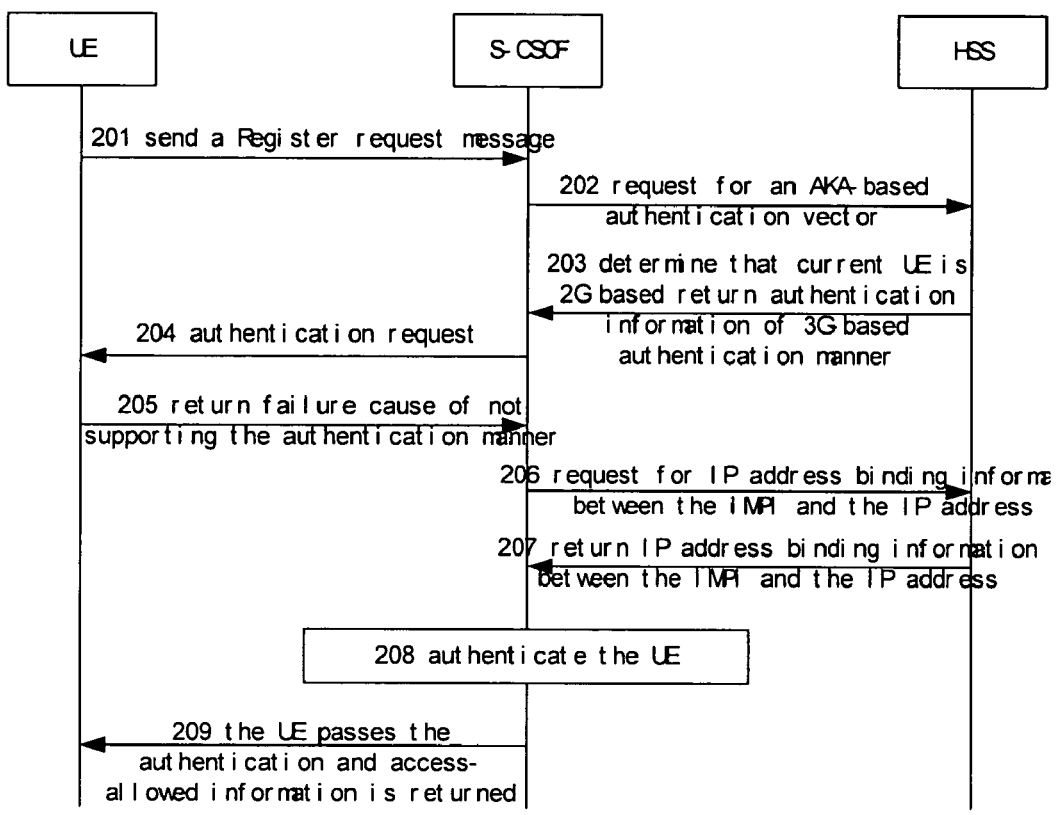
FIG. 2 is a schematic diagram illustration according to the embodiment 2 of the present invention.

FIG. 2 is a schematic diagram illustration according to the embodiment 2 of the present invention. The subscriber in the present embodiment is 3G based but using a 2G-based UE.

Step 201: when needing to use IMS services, UE will initiate a Message of register request in IMS domain, wherein the Message of register request is transmitted to S-CSCF via P-CSCF and I-CSCF.

Step 202: S-CSCF chooses a 3G-based authentication mode, namely AKA-based authentication scheme, according to prior protocol flow and sends an authentication vector request message to HSS, namely S-CSCF requests HSS for AKA-based authentication vector information, meanwhile, the request message also comprises subscriber's IMPI or IMPU; if it is IMPU, HSS will find corresponding IMPI according to the IMPU.

Step 203: after receiving the authentication vector request from S-CSCF, HSS will obtain information of the requested AKA-based authentication vector according to identifier of the requested authentication mode in the request message, and then HSS will look up description information of the subscriber according to subscriber identity identifier in the request message so as to decide type of the subscriber. In the present embodiment, HSS figures out that the subscriber is 3G based and then returns authentication information of 3G-based authentication mode to S-CSCF; namely HSS returns AKA-based authentication vector information to S-CSCF.

Step 204: S-CSCF sends an authentication request to the UE.

Step 205: Since UE of the subscriber is 2G based, which does not support 3G-based authentication mode, it returns to S-CSCF failure information that authentication has failed because authentication mode is not supported. In a specific embodiment, a field can be added in the information returned by UE, or other methods can be adopted, if only to indicate that cause of the failure is the authentication mode is not supported.

Step 206: after receiving the failure information of which authentication has failed because authentication mode is not supported, S-CSCF will resend to HSS an authentication vector request that comprises an identifier requesting Early-IMS-based authentication vector.

Step 207: after receiving the request in step 206, HSS will return authentication information of Early-IMS-based authentication vector to S-CSCF, namely the IP address binding information of the IMPI and the IP address of the subscriber.

Step 208: after receiving the returned message, S-CSCF will authenticate the subscriber by adopting Early-IMS-based authentication vector; namely check whether the subscriber's IP address in the Message of register request from UE matches the IP address in the IP address binding information of the IMPI and the IP address from HSS; and if yes, the subscriber will be determined as legal and the IP address binding information of the IMPI and the IP address of the subscriber will be stored.

The above-noted process of authenticating UE can also be fulfilled by HSS. When authenticating operation upon UE is fulfilled by HSS, the authentication vector request sent in step 206 will carry the IP address of the subscriber requesting access; HSS will check whether the IP address matches the self-stored IP address in the IP address binding information of the IMPI and IP address; if yes, the subscriber will be determined as legal, and, the information returned to S-CSCF by HSS will indicate that UE has passed authentication and will also carry the IP address binding information of the IMPI and the IP address of the subscriber for S-CSCF to apply in subsequent operation. If no, the subscriber will be determined as illegal, and, the information returned to S-CSCF by HSS will indicate that UE has not passed the authentication; namely HSS will return failure information of authentication to S-CSCF.

Step 209: if subscriber passes the authentication, S-CSCF will send access-allowed information to UE. If the subscriber does not pass the authentication, S-CSCF will send access-rejected information to UE.

In addition, after receiving the failure information from UE that authentication is failed because the authentication mode is not supported, S-CSCF will further judge the field of access network type in the Message of register request, so as to avoid some subscribers, who are able to execute 3G-based authentication mode but reject doing so, from illegally using services. For instance, a subscriber uses a 3G-based subscriber card and 3G cell phone, but failure information that indicates the authentication mode is not supported is returned in step 205, hereby S-CSCF can determine whether he is an unauthenticated subscriber through judging field of access network type in the Register message; if the field shows that access network is the 3G one, S-CSCF can determine that the subscriber is a baneful subscriber and reject him from being accessed because the 2G-based UE is impossible to access via a 3G access network.

Figure 3:
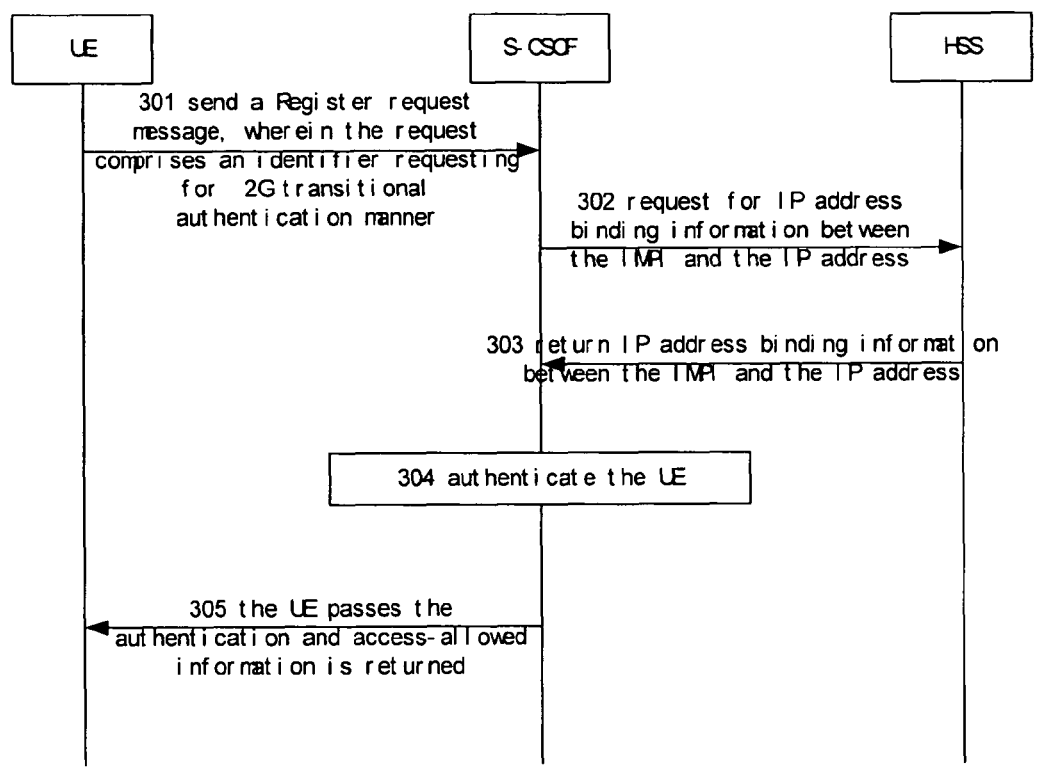
FIG. 3 is a schematic diagram illustration according to the embodiment 3 of the present invention.

FIG. 3 is a schematic diagram illustration according to the embodiment 3 when applying the present invention. The subscriber in the present embodiment is 2G-based using a 2G-based terminal.

Step 301: when needing to use IMS services, UE will initiate a Message of register request in IMS field, wherein the Message of register request is transmitted to S-CSCF via P-CSCF and I-CSCF, moreover, the Message of register request comprises an identifier requesting for Early-IMS-based authentication vector.

In a specific embodiment, a field can be added in the Message of register request to denote the request for Early-IMS-based authentication vector; or a default value can be preset in the Message of register request, namely the default part of the message can be set to indicate that 2G transitional authentication mode is supported; for instance, the Message of register request comprises no security headers used in the message of 3G-based authentication mode message, which indicates the Early-IMS-based authentication vector is expected; or other methods can be adopted if only authentication information requesting for Early-IMS-based authentication vector can be indicated.

Step 302: S-CSCF sends an authentication vector request to HSS according to the received Message of register request, wherein the authentication vector request comprises an identifier requesting for the Early-IMS-based authentication vector, meanwhile, the request message also comprises IMPI or IMPU of the subscriber; if it is IMPU, HSS will find the corresponding IMPI according to the IMPU.

Step 303: after receiving the request in step 302, HSS returns authentication information of the Early-IMS-based authentication vector to S-CSCF, namely the IP address binding information of the IMPI and the IP address of the subscriber.

Step 304: after receiving the returned message, S-CSCF will authenticate the subscriber by adopting Early-IMS-based authentication vector; namely check whether subscriber's IP address in the Message of register request from UE matches the IP address in the IP address binding information of the IMPI and the IP address from HSS; if yes, the subscriber will be determined as legal and the IP address binding information of the IMPI and the IP address of the subscriber will be stored.

The process of authenticating UE can also be fulfilled by HSS. When authenticating operation upon UE is fulfilled by HSS, the authentication vector request transmitted in step 302 will carry IP address of the subscriber requesting access, HSS will check whether the IP address matches the self-stored IP address in the IP address binding information of the IMPI and the IP address; and if yes, the subscriber will be determined as legal, hereby, the information returned to S-CSCF by HSS will indicate that the UE has passed authentication and will also carry the IP address binding information of the IMPI and the IP address of the subscriber for S-CSCF to apply in subsequent operation; if no, the subscriber will be determined as illegal, hereby, the information returned to S-CSCF by HSS will indicate that the UE has not passed the authentication; namely failure information of authentication will be returned.

Step 305: if the subscriber passes the authentication, S-CSCF will send access-allowed information to UE. If the subscriber does not pass the authentication, S-CSCF will send access-rejected information to UE.

In addition, to avoid some subscribers, who are able to execute 3G-based authentication mode but reject doing so, from illegally using services, information of access network type can be added in the authentication vector request sent in step 302; if HSS detects the subscriber is 3G-based and type of access network thereof is 3G network, it can be concluded that the UE is also 3G-based (because a 2G-based UE cannot be connected to a 3G access network), so that it is concluded that the subscriber should choose a 3G-based authentication mode rather than an Early-IMS-based authentication vector. In the acknowledgement message sent to S-CSCF by HSS, the 3G-based authentication mode chosen by HSS is indicated and associated authentication information is contained, rather than authentication information of Early-IMS-based authentication vector is returned to S-CSCF. After receiving the information returned by HSS, S-CSCF can either choose 3G-based authentication mode to authenticate the subscriber, or choose to reject the current Message of register request of the subscriber.

The 3G-based subscriber in the above-noted embodiment supports Full-IMS-based authentication mode. In practical application, the subscriber thereof can also be 4G-based or of other types if only the subscriber supports Full-IMS-based authentication mode. In this way, the 3G-based subscribers in all embodiments above can be substituted by those who support the Full-IMS-based authentication mode.

The above description is just preferable embodiments of the present invention, not confining the protection scope of the invention. Various changes, equivalent substitutions and improvements may be made therein without departing from the spirit and scope of the invention as defined by the appended claims.

The invention claimed is:

1. A method for a network to choose an authentication mode, comprising the steps of:
   a Serving-Call Session Control Function (S-CSCF) entity receiving a Message of register request from a subscriber and sending an authentication vector request carrying an authentication mode identifier to a Home Subscriber Server (HSS); and
   the HSS determining whether the S-CSCF requests authentication information of an Early-IMS-based authentication vector according to the authentication mode identifier;
   if yes, the HSS returning authentication information of the Early-IMS-based authentication vector to the S-CSCF;
   otherwise, the HSS determining type of the subscriber that requests access,
      if the subscriber supports a Full-IMS-based authentication mode, returning authentication information of the Full-IMS-based authentication mode,
      if the subscriber is 2G based, the HSS returning authentication information of the Early-IMS-based authentication vector to the S-CSCF or returning unsuccessful information to the S-CSCF;
   wherein the authentication vector request with the authentication mode identifier sent to HSS by S-CSCF further comprises information of access network type;
   wherein the subscriber that supports the Full-IMS-based authentication mode is 3G based; and
   wherein after the HSS determining that the S-CSCF requires authentication information of the Early-IMS-based authentication vector further comprises the HSS judging the access network type of the subscriber; if the access network is a 2G network, continuing with the process of returning authentication information of the Early-IMS-based authentication vector to the S-CSCF; if the access network is a 3G network and the subscriber requesting access is 3G based, returning authentication information that supports Full-IMS-based authentication mode to the S-CSCF; the S-CSCF receiving the authentication information, authenticating the subscriber that supports the Full-IMS-based authentication mode by adopting the Full-IMS-based authentication mode or returning access-rejected information to the subscriber.

2. The method according to claim 1, wherein the authentication information that supports the Full-IMS-based authentication mode is AKA-based (Authentication and Key Agreement) authentication vector information;
   the step of authenticating the subscriber requesting access by adopting the Full-IMS-based authentication mode, comprises: adopting an AKA protocol to authenticate the subscriber.

3. The method according to claim 1, wherein the authentication information of the Early-IMS-based authentication vector is an IP address binding information of an IP Multimedia Private Identity (IMPI) and an IP address;
   after the process of returning authentication information of the Early-IMS-based authentication vector to the S-CSCF, further comprising:
   the S-CSCF checking whether the received subscriber's IP address matches the IP address in IP address binding information of the IMPI and the IP address received from HSS;
   if yes, the authentication is successful, otherwise, the subscriber doesn't pass the authentication, and the authentication result is obtained.

4. The method according to claim 1, after the process of the HSS returning unsuccessful information to the S-CSCF, further comprising: the S-CSCF sending the authentication vector request with the identifier requiring for Early-IMS-based authentication vector to the HSS, and then the HSS returning Early-IMS-based authentication information to the S-CSCF according to the request.

5. The method according to claim 1, wherein authentication vector request sent to the HSS by the S-CSCF further comprises:
   an IP address of the subscriber;
   the authentication information of the Early-IMS-based authentication vector is the IP address binding information of the IMPI and the IP address.

6. The method according to claim 1, further comprising: the S-CSCF judging whether the Message of register request from the subscriber comprises the identifier requiring for the Early-IMS-based authentication vector;
   if yes, sending the authentication vector request with the authentication mode identifier requiring for the Early-IMS-based authentication vector, otherwise, sending the authentication vector request with the authentication mode identifier requiring for the Full-IMS-based authentication mode.

7. The method according to claim 6, wherein the identifier requesting for the Early-IMS-based authentication vector, which is comprised in the Message of register request sent by the subscriber either via a predefined field of the message or a predefined default value, indicating the Early-IMS-based authentication vector is utilized;
   the predefined default value is the authentication mode message not containing the security headers used in the default Full-IMS-based authentication mode message.

8. The method according to claim 1, wherein the identifier requesting for the Early-IMS-based authentication vector, which is comprised in the authentication vector request message sent to HSS by S-CSCF, is carried in a field that indicates the request for the Full-IMS-based authentication mode.

9. The method according to claim 1, further comprising:
   after the HSS returning authentication information of the Early-IMS-based authentication vector to the S-CSCF, the S-CSCF returning access allowed information or access rejected information to the 2G-based subscriber according to the authentication result obtained by adopting the Early-IMS-based authentication vector.

10. The method according to claim 1, further comprising:
    after the HSS returning unsuccessful information to the S-CSCF, the S-CSCF notifying the 2G-based subscriber of access rejection.

11. A communication system, comprising:
    a Home Subscriber Server (HSS); and
    a Serving-Call Session Control Function (S-CSCF) entity adapted to receive a Message of register request from a subscriber and send an authentication vector request carrying an authentication mode identifier to the HSS;
    wherein:
    the HSS is adapted to judge whether the S-CSCF requests for the authentication information of an Early-IMS-based authentication vector according to the authentication mode identifier;
    if yes, the HSS is adapted to return authentication information of the Early-IMS-based authentication vector to the S-CSCF;
    otherwise, the HSS is adapted to determine type of the subscriber that requests access, if the subscriber supports a Full-IMS-based authentication mode, the HSS is adapted to return authentication information of the Full- IMS-based authentication mode; if the subscriber is 2G based, the HSS is adapted to return authentication information of the Early-IMS-based authentication vector to the S-CSCF or return unsuccessful information to the S-CSCF;

wherein the authentication vector request with the authentication mode identifier further comprises information of access network type;

wherein the subscriber that supports the Full-IMS-based authentication mode is 3G based; and wherein the HSS is adapted to judge the access network type of the subscriber; if the access network is a 2G network, the HSS adapted to continue with the process of returning authentication information of the Early-IMS-based authentication vector to the S-CSCF; if the access network is a 3G network and the subscriber requesting access is 3G based, the HSS adapted to return authentication information that supports Full-IMS-based authentication mode to the S-CSCF; the S-CSCF adapted to receive the authentication information and authenticate the subscriber that supports the Full-IMS-based authentication mode by adopting the Full-IMS-based authentication mode or returning access-rejected information to the subscriber.

12. A method for choosing an authentication mode, the method comprising:

receiving an authentication vector request carrying an authentication mode identifier;

determining whether the authentication vector request requests authentication information of an Early-IMS-based authentication vector according to the authentication mode identifier;

if the authentication vector request requests authentication information of an Early-IMS-based authentication vector, transmitting authentication information of the Early-IMS-based authentication vector;

if the authentication vector request requests authentication information of an Early-IMS-based authentication vector, determining a type of subscriber that requests access, if the subscriber supports a Full-IMS-based authentication mode, transmitting authentication information of the Full-IMS-based authentication mode, if the subscriber is 2G based, transmitting authentication information of the Early-IMS-based authentication vector or transmitting unsuccessful information;

wherein the authentication vector request with the authentication mode identifier sent to HSS by S-CSCF further comprises information of access network type;

wherein the subscriber that supports the Full-IMS-based authentication mode is 3G based; and wherein after the HSS determining that the S-CSCF requires authentication information of the Early-IMS-based authentication vector further comprises the HSS judging the access network type of the subscriber; if the access network is a 2G network, continuing with the process of returning authentication information of the Early-IMS-based authentication vector to the S-CSCF; if the access network is a 3G network and the subscriber requesting access is 3G based, returning authentication information that supports Full-IMS-based authentication mode to the S-CSCF; the S-CSCF receiving the authentication information, authenticating the subscriber that supports the Full-IMS-based authentication mode by adopting the Full-IMS-based authentication mode or returning access-rejected information to the subscriber.

13. The method of claim 12, wherein the receiving is performed at a Home Subscriber Server (HSS).

14. The method of claim 13, wherein the authentication vector request is received from a Serving-Call Session Control Function (S-CSCF) entity.

15. The method of claim 14, wherein the authentication vector request is based upon a Message of register request received at the S-CSCF from a subscriber.

16. The method of claim 14, wherein each instance of transmitting authentication information comprises transmitting authentication information from the HSS to the S-CSCF.

* * * * *